(12) United States Patent
Radu et al.

(10) Patent No.: US 11,958,956 B1
(45) Date of Patent: Apr. 16, 2024

(54) ADDITIVE-POLYMER COMPOSITE MATERIALS AND METHODS OF FABRICATING THE SAME

(71) Applicants: Daniela Rodica Radu, Miami, FL (US); Cheng-Yu Lai, Miami, FL (US); Melissa Venedicto, Miami, FL (US); Faizan Syed, Miami, FL (US); Dakota Aaron Thomas, Miami, FL (US); Samuel Oyon, Miami, FL (US)

(72) Inventors: Daniela Rodica Radu, Miami, FL (US); Cheng-Yu Lai, Miami, FL (US); Melissa Venedicto, Miami, FL (US); Faizan Syed, Miami, FL (US); Dakota Aaron Thomas, Miami, FL (US); Samuel Oyon, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 18/356,673

(22) Filed: Jul. 21, 2023

(51) Int. Cl.
| | |
|---|---|
| *C08K 3/11* | (2018.01) |
| *B29C 48/14* | (2019.01) |
| *C08K 3/30* | (2006.01) |

(52) U.S. Cl.
CPC ............ *C08K 3/11* (2018.01); *B29C 48/14* (2019.02); *C08K 3/30* (2013.01); *C08K 2003/3009* (2013.01); *C08K 2201/005* (2013.01); *C08K 2201/011* (2013.01)

(58) Field of Classification Search
None
See application file for complete search history.

(56) References Cited

U.S. PATENT DOCUMENTS

| | | | | |
|---|---|---|---|---|
| 11,591,467 | B2* | 2/2023 | Pomestchenko | C08K 3/042 |
| 2009/0014691 | A1* | 1/2009 | Kint | C01B 33/44 |
| | | | | 523/202 |
| 2016/0276056 | A1* | 9/2016 | Stolyarov | C09D 11/38 |
| 2017/0183476 | A1* | 6/2017 | Leu | C08K 3/346 |

FOREIGN PATENT DOCUMENTS

CN 115253714 A * 11/2022

OTHER PUBLICATIONS

CN115253714A, Nov. 2022, Machine translation (Year: 2022).*
Sreekumar et al., International Journal of Scientific Technology and Research, vol. 8, Issue 08, Aug. 2019, p. 1381 (Year: 2019).*

* cited by examiner

*Primary Examiner* — Satya B Sastri
(74) *Attorney, Agent, or Firm* — Saliwanchik, Lloyd & Eisenschenk

(57) ABSTRACT

Additive-polymer precursor materials for filaments (e.g., for three-dimensional (3D) printing) are provided, as well as methods of fabricating and using the same. One or more two-dimensional (2D) additive materials (e.g., nano materials, such as nanosheets) can be mixed with a polymer base to give an additive-polymer precursor composite material. The additive material can be dissolved in a first solvent to give an additive solution, and the polymer can be dissolved in a second solvent to give a polymer base. The additive solution can be mixed with the polymer base to give a mixed solution. Solvent casting can then be performed on the mixed solution to evaporate the solvent(s) and give the additive-polymer precursor composite material, which can have a layered structure.

15 Claims, 10 Drawing Sheets

ADDITIVE-POLYMER COMPOSITE MATERIALS AND METHODS OF FABRICATING THE SAME

GOVERNMENT SUPPORT

This invention was made with government support under 80NSSC19M0201 awarded by the National Aeronautics and Space Administration. The government has certain rights in the invention.

BACKGROUND

Three-dimensional (3D) printing typically uses a polymer filament at the feedstock for the printing. Currently, mixing additive materials into polymer systems requires dissolving the polymer by heating, letting the mixture cool, and introducing the additive material directly into the polymer solution either by direct mixing or by first dispersing in another solvent. Some additives may be used with polymers that are then used as filament feedstock for 3D printing. Another method to introduce an additive is via a ring-opening polymerization of lactic acid to create the polymer in the proximity of the additive instead of directly adding the additive material. This method has the disadvantages of the additional time it takes to heat the material and the possibility of disrupting the structure or morphology of the additive filler material.

BRIEF SUMMARY

Embodiments of the subject invention provide novel and advantageous additive-polymer precursor materials for filaments (e.g., for three-dimensional (3D) printing), as well as methods of fabricating and using the same. One or more two-dimensional (2D) additive materials (e.g., nano materials, such as nanosheets) can be mixed with a polymer base to give an additive-polymer precursor composite material. The additive material can be dissolved in a first solvent to give an additive solution, and the polymer can be dissolved in a second solvent (which may be the same as or different from the first solvent) to give a polymer base. The additive solution can be mixed with the polymer base to give a mixed solution. Solvent casting can then be performed on the mixed solution to evaporate the solvent(s) and give the additive-polymer precursor composite material, which advantageously has a layered structure.

In an embodiment, a method of fabricating an additive-polymer composite material can comprise: dispersing an additive material in a first solvent to give an additive dispersion (e.g., an additive homogeneous dispersion), the additive material being 2D material; dissolving a polymer in a second solvent to give a polymer base; mixing the additive dispersion with the polymer base to give a mixed solution; and performing solvent casting on the mixed solution to evaporate any solvent and give the additive-polymer composite material. The additive material can be a nanomaterial; for example, the additive material can comprise nanosheets. The additive material can be a transition metal dichalcogenide (TMD) with a formula of $MX_2$, where M is a transition metal atom and X is a chalcogen atom (e.g., $MoS_2$). The method can further comprise cutting the additive-polymer composite material into a plurality of cut pieces each having a largest dimension of no more than 10 millimeters (mm) (e.g., no more than 5 mm). The method can further comprise heating the plurality of cut pieces in an oven (e.g., at a temperature of at least 50° C. or at least 55° C. or at least 60° C.). The method can further comprise inserting the plurality of cut pieces into an extruder and extruding the plurality of pieces into a filament (this can be after heating the cut pieces, if the heating is performed). The method can further comprise, before inserting the plurality of cut pieces into the extruder, pre-heating the extruder to a temperature that is at least as high as a melting point of the polymer. The first solvent can be different from the second solvent. The first solvent can comprise one or more polar components and/or one or more hydrogen bonding components. The mixing of the additive dispersion with the polymer base can comprise adding the additive dispersion and the polymer base to an airtight container and rotating the airtight container (e.g., at a rate in a range of from 5 revolutions per minute (rpm) to 100 rpm). The performing of the solvent casting can comprise transferring the mixed solution to a receptacle and placing the receptacle in a ventilated fume hood. The performing of the solvent casting can further comprise heating the mixed solution in an oven (e.g., at a temperature of at least 50° C. or at least 55° C. or at least 60° C.). The first solvent can be, for example, N-methyl-pyrrolidone (NMP), isopropanol (IPA), or dimethyl sulfoxide (DMSO), though embodiments are not limited thereto. The second solvent can be, for example, chloroform, methylene chloride, 1,1,2-trichloroethane, or dichloroacetic acid, though embodiments are not limited thereto. The polymer can be, for example, poly lactic acid (PLA), polycaprolactone (PCL), poly(methyl methacrylate) (PMMA), polyvinyl alcohol (PVA), polyvinylidene fluoride (PVDF), polyimide, thermoplastic elastomer (TPE), any Nylon polymer, or any combination thereof, though embodiments are not limited thereto.

In another embodiment, an additive-polymer composite material can be fabricated by a method as disclosed herein and can comprise the polymer having nanosheets of the additive dispersed therein. The additive-polymer composite material can have a layered structure. The additive can be a TMD with a formula of $MX_2$, where M is a transition metal atom and X is a chalcogen atom. For example, the TMD can be $MoS_2$, and the polymer can be PLA.

BRIEF DESCRIPTION OF DRAWINGS

FIGS. 7A, 7B, and 7C show carbon (C), molybdenum (Mo), and sulfur (S), respectively. The scale bar for each of FIGS. 7A, 7B, and 7C is 50 μm.

DETAILED DESCRIPTION

Figure 1:
FIG. 1 shows a representation of a synthesis process of a filament precursor composite, according to an embodiment of the subject invention.
Figure 1:
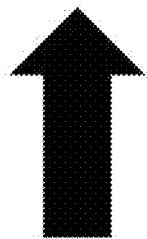
Figure 1:
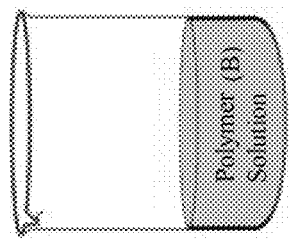
Figure 1:
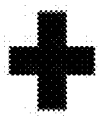
Figure 1:
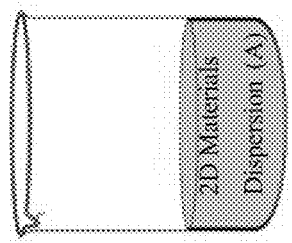

Embodiments of the subject invention provide novel and advantageous additive-polymer precursor materials for filaments (e.g., for three-dimensional (3D) printing), as well as methods of fabricating and using the same. One or more two-dimensional (2D) additive materials (e.g., nano materials, such as nanosheets) can be mixed with a polymer base to give an additive-polymer precursor composite material. The additive material can be dissolved in a first solvent to give an additive solution, and the polymer can be dissolved in a second solvent (which may be the same as or different from the first solvent) to give a polymer base. The additive solution can be mixed with the polymer base to give a mixed solution. Solvent casting can then be performed on the mixed solution to evaporate the solvent(s) and give the additive-polymer precursor composite material, which advantageously has a layered structure. The additive-polymer precursor composite material can be cut into smaller pieces (e.g., with no dimension being larger than 10 millimeters (mm), such as no dimension being larger than 5 mm), making it easier to extrude the material (in the form of the smaller pieces) into a filament (e.g., for 3D printing). The fabrication methods disclosed herein result in a structural difference for the additive-polymer precursor composite material compared to other filament precursor materials, including the layered structure and the 2D additive(s).

Transition metal dichalcogenides (TMDs) are atomically thin semiconductors with a formula of $MX_2$, where M is a transition metal atom (e.g., molybdenum (Mo), tungsten (W), copper (Cu), or others), and X is a chalcogen atom (e.g., sulfur (S), selenium (Se), tellurium (Te), and others). In many embodiments, the additive of the additive-polymer precursor composite material is a TMD (e.g., $MoS_2$).

In many embodiments, the polymer is a thermoplastic polymer. The polymer can be, for example, poly lactic acid (PLA), polycaprolactone (PCL), poly(methyl methacrylate) (PMMA), polyvinyl alcohol (PVA), polyvinylidene fluoride (PVDF), polyimides, thermoplastic elastomer (TPE), any Nylon polymer, or any combination thereof, though embodiments are not limited thereto.

Because typical thermoplastic polymeric materials dissolve easily into a solvent, the dispersion of the 2D additive material (e.g., nano material) into the polymer base followed by mixing leads to a homogeneous mixture that can be dried (e.g., via solvent casting) in embodiments of the subject invention. The homogeneous mixture after drying can be further fed into a filament making instrument (e.g., an extruder), thereby significantly improving the filament process (e.g., by making it smoother, faster, and easier). The use of 2D materials (e.g., TMDs) can enhance the polymer filament via the properties of the additive material (e.g., TMDs), such as conferring to the final product properties that are embedded in the additive materials, including conductivity, magnetic properties, semiconductor properties, and/or biocompatibility (e.g., for use in a biomedical application). The layered structure of the additive-polymer precursor composites of embodiments of the subject invention confers alignment of the polymer around the 2D material (e.g., nanosheets), impacting in a positive way the microstructure of any produced filament (and therefore any object printed using such filament).

In TMDs, the sandwiching of the transition metal atoms by the chalcogen atoms are via van der Waal interactions and form 3D crystals. TMD characteristics are dependent on the coordination and oxidation state of the metal, and these range from superconductive to metallic, semi metallic, or semiconducting. TMDs can comprise nanosheets or nanoparticles, which reinforce the material with which it is incorporated, and, once combined, a TMD composite will further enhance the system's mechanical characteristics it's introduced to. The incorporation of TMDs into polymer systems in embodiments of the subject invention provides the chance to expand 2D materials into complex 3D structures. These structures can be applied to the biomedical field, optical applications, electronics, and more.

Figure 2:
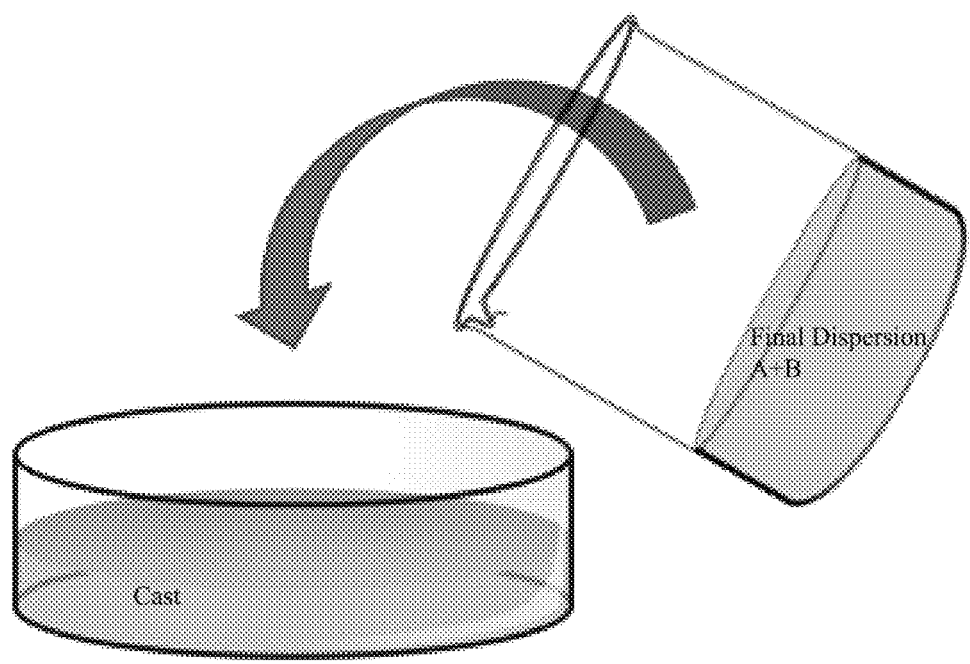
FIG. 2 shows a representation of solvent casting in a synthesis process of a filament precursor composite, according to an embodiment of the subject invention.

FIGS. 1 and 2 show representative views of a method of fabricating an additive-polymer material (e.g., a precursor material for filaments (e.g., for 3D printing)), according to an embodiment of the subject invention. Referring to FIGS. 1 and 2, an additive material can be dispersed in a first solvent to give an additive solution (see left-most portion of FIG. 1). The additive material can be a 2D additive material (e.g., a nano material, such as nanosheets). The additive material can be a TMD (e.g., $MoS_2$), though embodiments are not limited thereto. The polymer can be dissolved in a second solvent (see middle portion of FIG. 1), which may be the same as or different from the first solvent to give a polymer base. The additive solution can be mixed with the polymer base to give a mixed solution (see FIG. 1). The mixing can include pouring one of the solutions (the additive solution or the polymer base) into the other solution (the additive solution or the polymer base). The mixing can further include, for example, mixing (e.g., in a centrifuge) at a specific rate (e.g., in a range of from 5 revolutions per minute (rpm) to 100 rpm, such as from 10 rpm to 50 rpm, or 20 rpm to 35 rpm) for a set period of time (e.g., for at least 1 hour, at least 3 hours, at least 5 hours, at least 8 hours, or overnight). The mixing can be done in a container, such as an airtight container. The mixing process can ensure the additive is properly incorporated into the polymer base. The mixing process avoids the need for heating the additive material or introducing any gases to dissolve the additive material. After mixing, the mixed solution can undergo solvent casting, where the solvent (e.g., the first solvent and/or second solvent) is evaporated. The mixed solution can be optionally transferred (e.g., poured) into a receptacle (e.g., a glass container, such as a glass petri dish of no more than 200 mm in diameter). The solvent casting can include allowing the mixed solution (e.g., in the receptacle) to set for a set period of time (e.g., for at least 1 hour, at least 3 hours, at least 5 hours, at least 8 hours, or overnight), and ventilation can be provided (e.g., the mixed solution can be placed in a ventilated fume hood). This process is denoted as solvent casting as the solvent(s) is/are being evaporated. In some embodiments, in order to speed the reaction along the mixed solution can be placed in an oven (e.g., at a temperature of at least 50° C., such as 60° C. or about 60° C.) for a set period of time (e.g., for at least 1 hour, at least 3 hours, at least 5 hours, at least 8 hours, or overnight). The use of an oven helps ensure the solvents evaporate due to the increase in temperature.

After complete evaporation of the solvent(s) via solvent casting (which may or may not include the use of an oven), the resulting dried material is the additive-polymer material, which can have a layered structure. The additive-polymer material can be cut into smaller pieces (e.g., with no dimension being larger than 10 mm, such as no dimension being larger than 5 mm), making it easier to extrude the material (in the form of the smaller pieces) into a filament (e.g., for 3D printing). The cutting can be done by using a shredding device (e.g., a paper shredder), cutting by hand, or by any suitable means known in the art.

The small cut pieces can optionally be sifted through a grid or filter to ensure the small pieces are as small as desired. The additive-polymer material (either before or after cutting) can optionally be placed in an oven (e.g., at a temperature of at least 50° C., such as 60° C. or about 60° C.) for a set period of time (e.g., for at least 1 hour, at least 3 hours, at least 5 hours, at least 8 hours, or overnight) to help ensure the additive-polymer material is free from absorbed/absorbing humidity. The additive-polymer material can optionally be mixed with neat polymer material (which can have optionally been placed in an oven (e.g., at a temperature of at least 50° C., such as 60° C. or about 60° C.) for a set period of time (e.g., for at least 1 hour, at least 3 hours, at least 5 hours, at least 8 hours, or overnight)). The amount of neat polymer depends on the desired concentration of additive in the final material. That is, if the concentration of the additive in the additive-polymer material is too high, then neat polymer can be introduced to get the concentration of the additive to the desired level.

The final additive-polymer material after cutting into small pieces can be introduced into an extruding device (e.g., an extruder). The type of extruding device used may depend on the type of polymer used. The extruding device can be heated or pre-heated to melting temperature of the polymer (e.g., in a range of from 185° C. to 190° C. for PLA). The extruding device can be endowed with temperature control. The temperature can be tuned during extrusion to meet the desired diameter of the filament, which may depend on the 3D printer or 3D printing system that will use the filament. The produced filament can have a diameter in a range of from, for example, 0.1 mm to 10 mm (or any value (or about any value) therewithin or any subrange therewithin having any values therewithin as endpoints).

The first solvent can be a solvent with polar and/or hydrogen-bonding components. The first solvent can be, for example, N-methyl-pyrrolidone (NMP), isopropanol (IPA), or dimethyl sulfoxide (DMSO), though embodiments are not limited thereto. The first solvent can be selected depending on the specific polymer and the specific additive used.

The concentration of the additive can depend on the desired final composite material and/or filament. The concentration of the additive in the additive-polymer material can be in a range of, for example, 1 wt % additive to 50 wt % additive (or any value (or about any value) therewithin or any subrange therewithin having any values therewithin as endpoints). All concentration percentages listed herein for the additive and the polymer are weight percentages. The dispersing of the additive in the first solvent can include using a mixer with a predetermined rotation speed for a predetermined time (e.g., for at least 10 minutes, for at least 30 minutes, for at least 1 hour, at least 3 hours, at least 5 hours, at least 8 hours, or overnight), which can depend on the specific additive and/or first solvent. The dispersing process can be performed until the additive is completely dispersed and the final dispersion appears (and/or is) fully homogeneous. The second solvent can be, for example, chloroform, methylene chloride, 1,1,2-trichloroethane, or dichloroacetic acid, though embodiments are not limited thereto. The dissolving of the polymer in the second solvent can include using a mixer with a predetermined rotation speed for a predetermined time (e.g., for at least 10 minutes, for at least 30 minutes, for at least 1 hour, at least 3 hours, at least 5 hours, at least 8 hours, or overnight), which can depend on the specific polymer and/or second solvent. The dissolving process can be performed until the polymer is completely dissolved.

Embodiments of the subject invention provide novel and advantageous additive-polymer precursor materials for filaments (e.g., for 3D printing), as well as methods of fabricating and using the same. The additive-polymer precursor materials can be formulated to enable the extrusion using a filament fabrication machine. Due to the semiconductor characteristics of TMDs, filaments made from TMD-polymer filament precursor composites have many applications ranging from the biomedical field to the optoelectronics field.

When ranges are used herein, combinations and subcombinations of ranges (e.g., subranges within the disclosed range) and specific values therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

MoS$_2$ was dispersed in DMSO to give a homogenous dispersion of the MoS$_2$ in the DMSO. This was done via a mixer with a predetermined rotation speed, and the mixing process was performed until the MoS$_2$ was completely dissolved to give the additive solution. PLA was dissolved in methylene chloride overnight to ensure a homogeneous solution as a polymer base (can also be referred to as the polymer solution). The additive solution was mixed with the polymer base by pouring the additive solution with the MoS$_2$ dispersed therein into the polymer solution and mixing at a mixing rate of 20 rpm to 100 rpm overnight (within an airtight container). The rate can be increased to shorten the dispersion process. This process ensures the MoS$_2$ is properly incorporated into the polymer solution (i.e., polymer base). This mixing process avoids the need to heat the material or introduce any gases to dissolve the material.

After mixing, the mixed solution was poured into a glass petri dish (100 mm-150 mm in diameter) and set overnight in a ventilated fume hood to give a dried material after the solvent(s) evaporate(s). This process (of pouring into a container (e.g., glass petri dish) and set for a period of time in a ventilated area) is denoted as solvent casting as the solvent(s) is/are being evaporated. In order to speed the reaction said container can be placed in an oven for a period of time (e.g., at least 5 hours, or overnight) to evaporate the solvent. The oven can be at a temperature of, for example, 60° C. or about 60° C. The use of an oven can force the solvent(s) to be evaporated due to the increase in temperature. The use of an oven when evaporating can be particularly useful when using certain polymer bases (e.g., PCL). The heating in an oven was not performed within this example.

The dried $MoS_2$-PLA material (also referred to as a filament precursor composite) was further cut into small (5 mm×5 mm (or smaller)) pieces by using an office paper shredder and/or by hand with scissors. Pieces can be sifted through a 5 mm×5 mm grid to ensure the material was small enough. These pieces were then placed in an oven (at 60° C. or about 60° C.), ensuring the $MoS_2$-PLA material was free from absorbing humidity. The material was mixed with neat PLA (which was also placed overnight in the oven (at 60° C. or about 60° C.)), and the amount of neat polymer introduced depends on the desired concentration. For example, if the starting material was 20%/80% ($MoS_2$/PLA) and the desired filament had a concentration of 5%/95% ($MoS_2$/PLA), extra PLA would be added until the desired concentration was reached. In this example, the final concentration was 10%/90% ($MoS_2$/PLA). The material was then added into an extruder system (e.g., the FilaBot® or Wellzoom® filament extruder). The extruder was pre-heated to the polymer base's melting temperature (in this case, in a range of from 185° C.-190° C. for PLA). The filament extruder was endowed with temperature control. The temperature was also be tuned to meet the desired diameter of the filament. In order to be able to print in an Ender 3@ system, the temperature was tuned such that the extruded filament diameter would be in a range of from 1.4 mm to 1.8 mm.

Figure 3A:
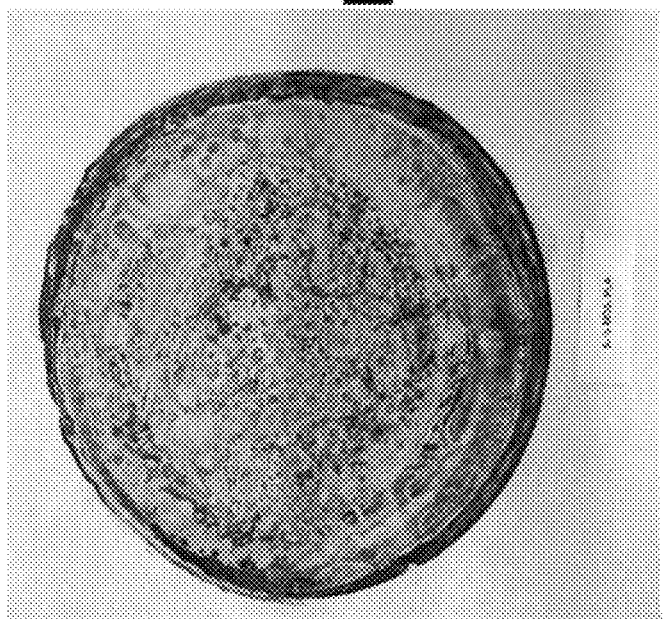
FIG. 3A shows an image of a solvent-casted filament precursor composite, according to an embodiment of the subject invention.
Figure 3B:
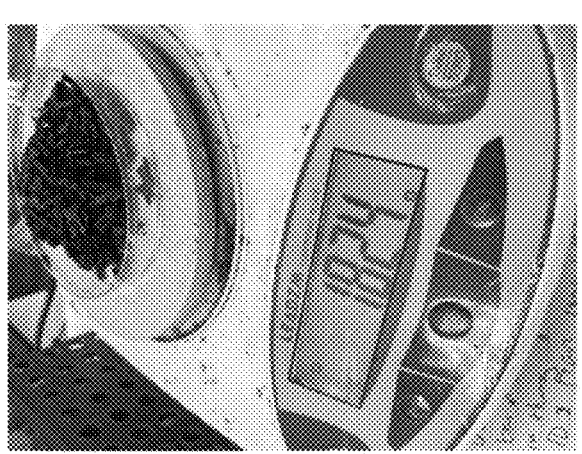
FIG. 3B shows an image of the solvent-casted filament precursor composite of FIG. 3A shred into small pieces (e.g., each piece no more than 10 millimeters (mm) in length).
Figure 3C:
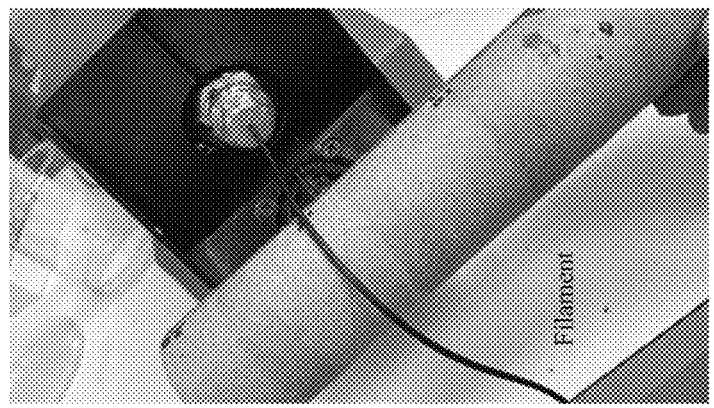
FIG. 3C shows an image of the small pieces of the shredded solvent-casted filament precursor composite (from FIG. 3B) placed in an extruder. The temperature can be set according to the melting temperature of the base (e.g., polymer base) of the solvent-casted filament precursor composite.
Figure 4:
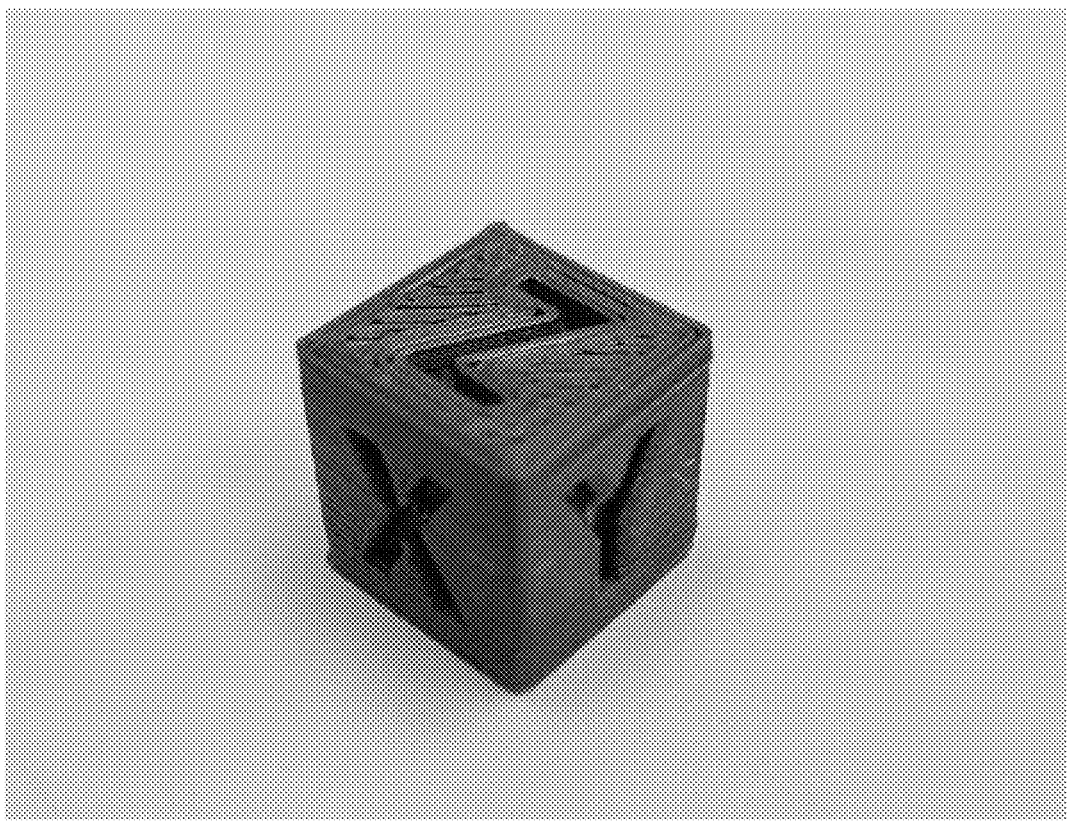
FIG. 4 shows an image of an object that has been three-dimensional (3D) printed using a 10% molybdenum sulfide ($MoS_2$)-polylactic acid (PLA) filament, according to an embodiment of the subject invention.
Figure 5A:
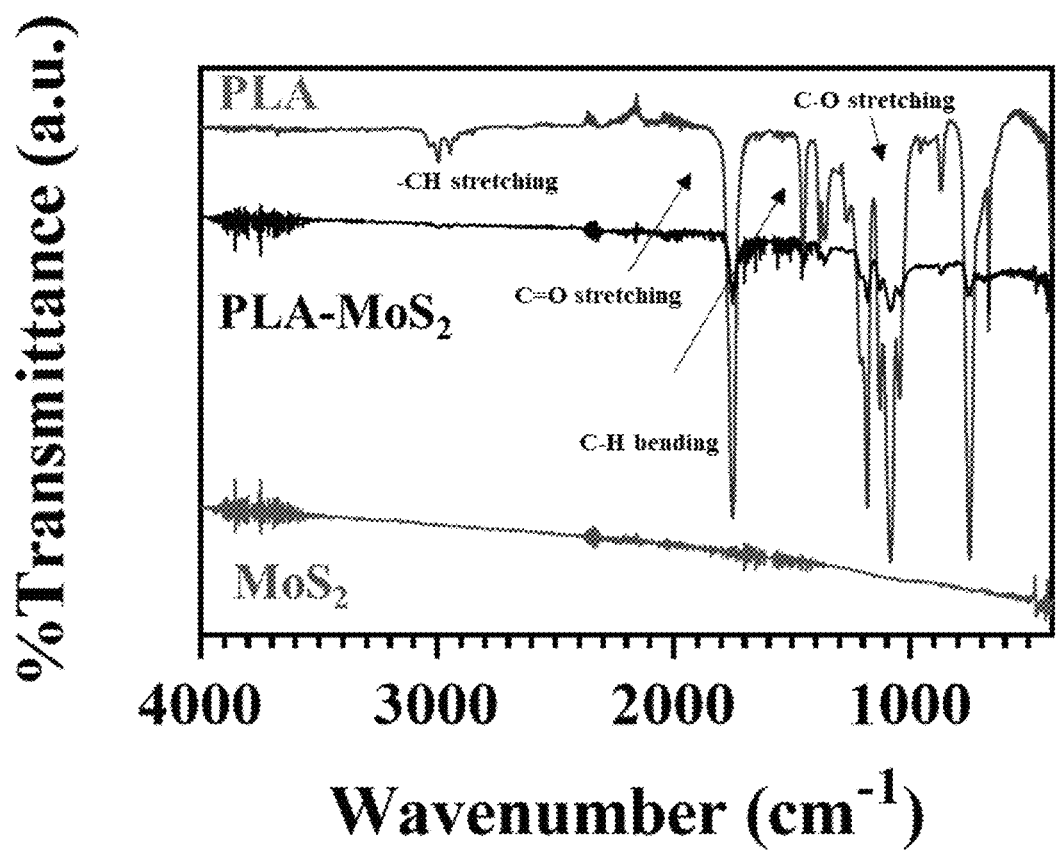
FIG. 5A shows a plot of intensity (in arbitrary units (a.u.)) versus 2θ (in degrees) for a $MoS_2$-PLA filament produced according to an embodiment of the subject invention.
Figure 5B:
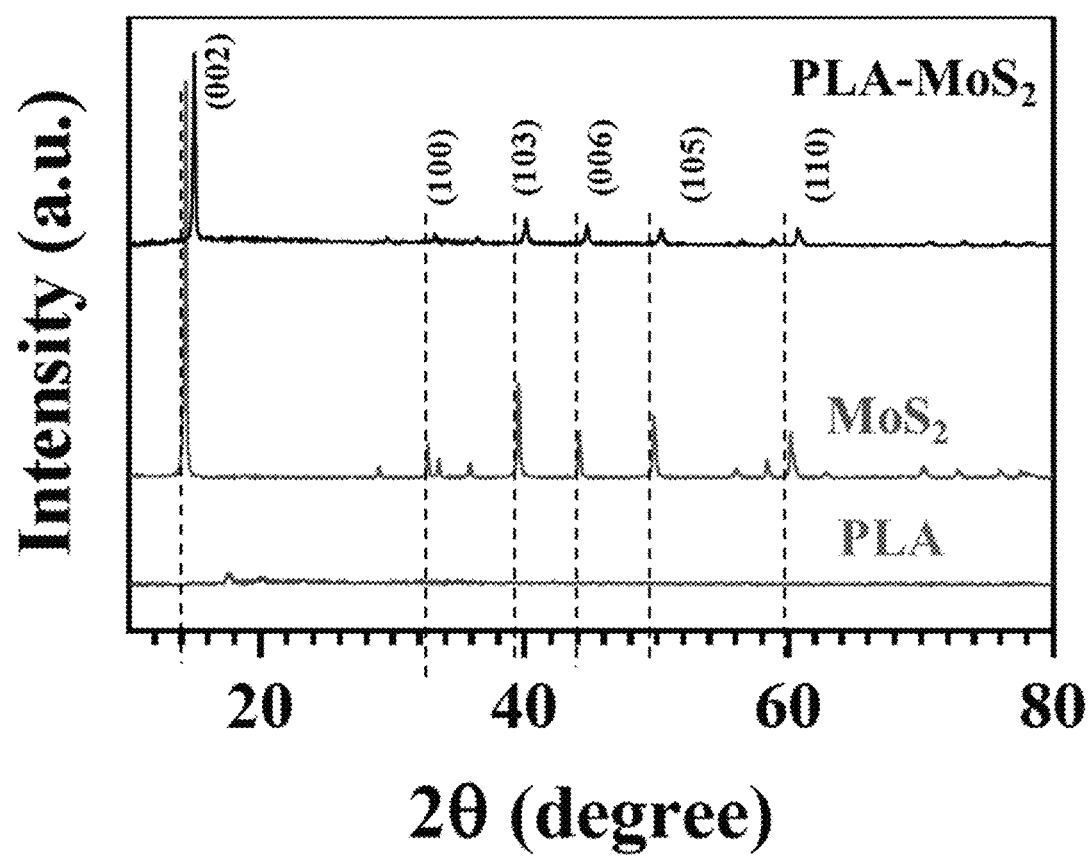
FIG. 5B shows a plot of percent transmittance (in a.u.) versus wavenumber (in 1/centimeters ($cm^{-1}$)) for a $MoS_2$-PLA filament produced according to an embodiment of the subject invention.
Figures 6A, 6B:
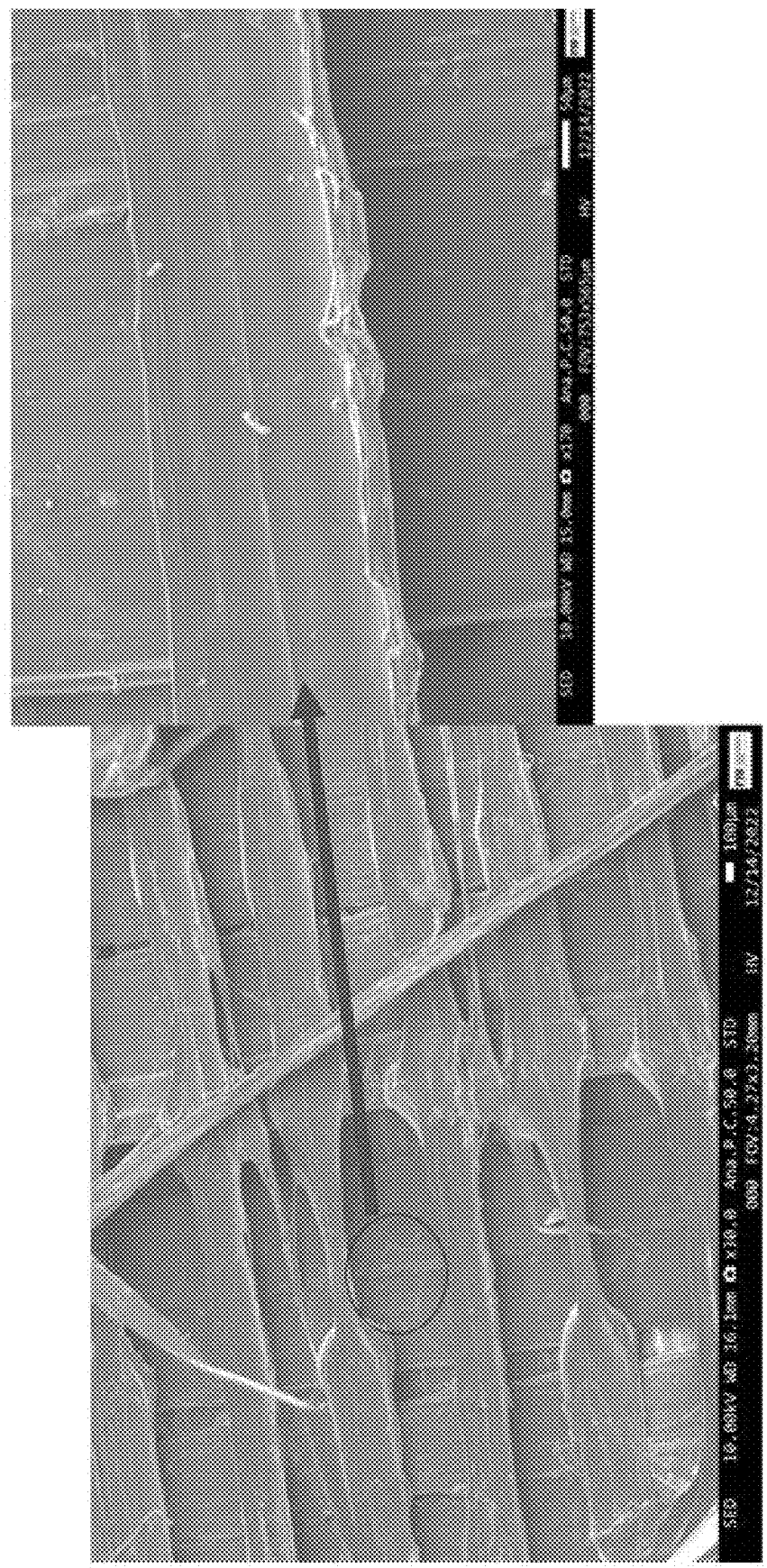
FIG. 6A shows an electron microscope image of a $MoS_2$-PLA filament composite produced according to an embodiment of the subject invention. The scale bar is 100 micrometers (μm).
FIG. 6B shows an enlarged electron microscope image of the circled region in FIG. 6A. The scale bar is 50 μm. The layered structure of the composite can be seen in FIGS. 6A and 6B.
Figure 7A:
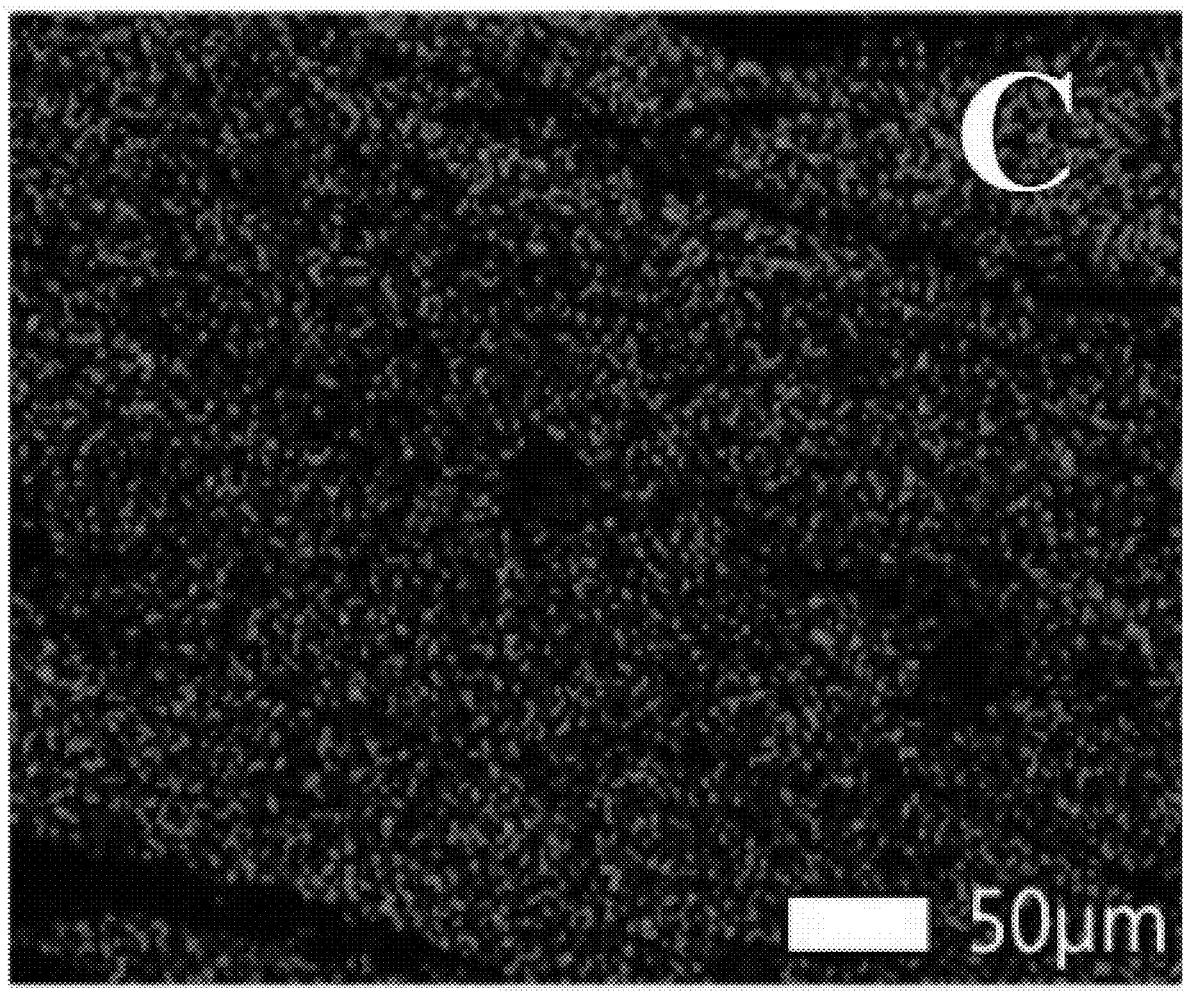
FIGS. 7A-7C shows energy dispersive spectroscopy (EDS) images, performed via scanning electron microscopy (SEM), of individual elements from a $MoS_2$-PLA filament composite produced according to an embodiment of the subject invention.
Figure 7B:
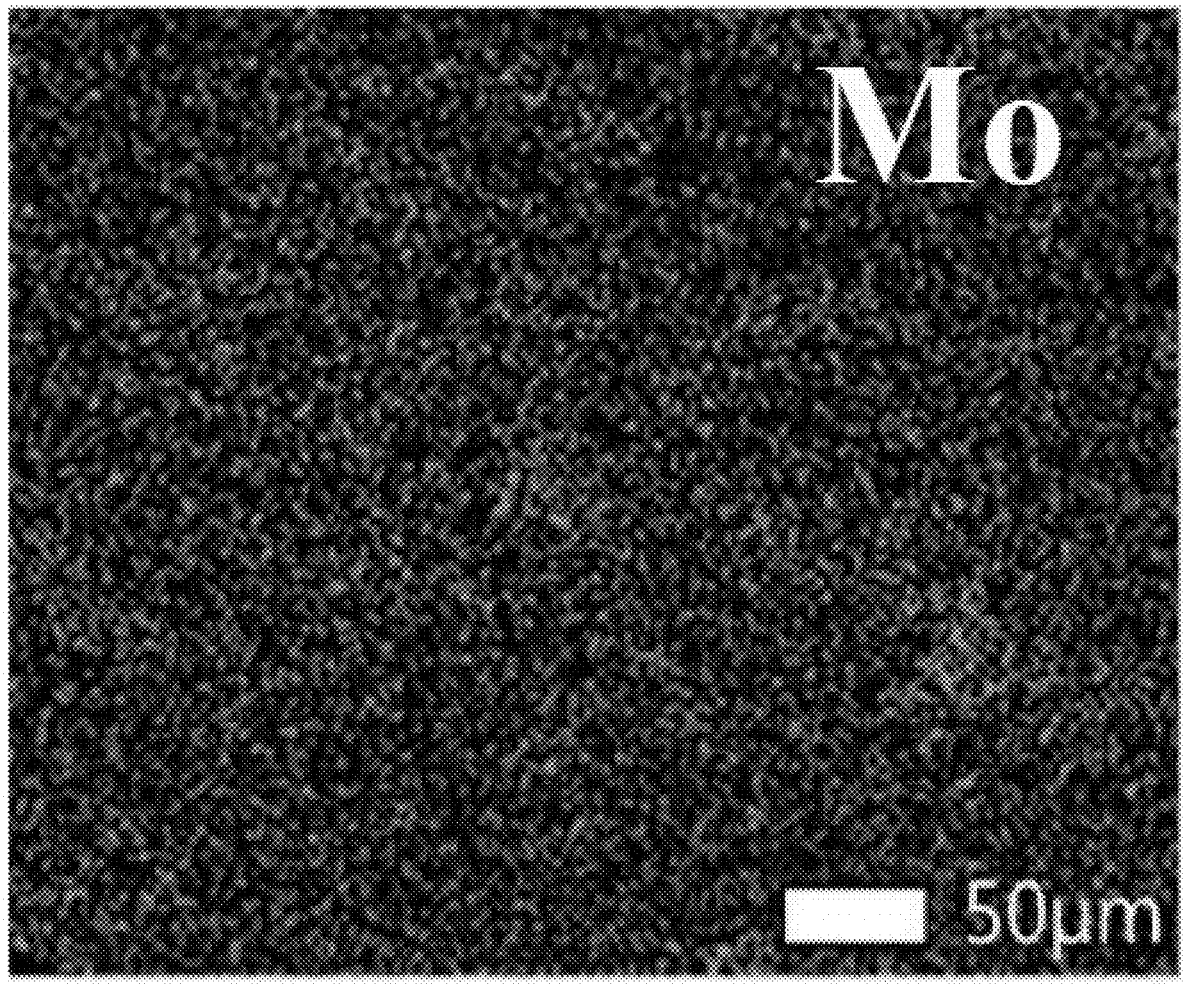
Figure 7C:
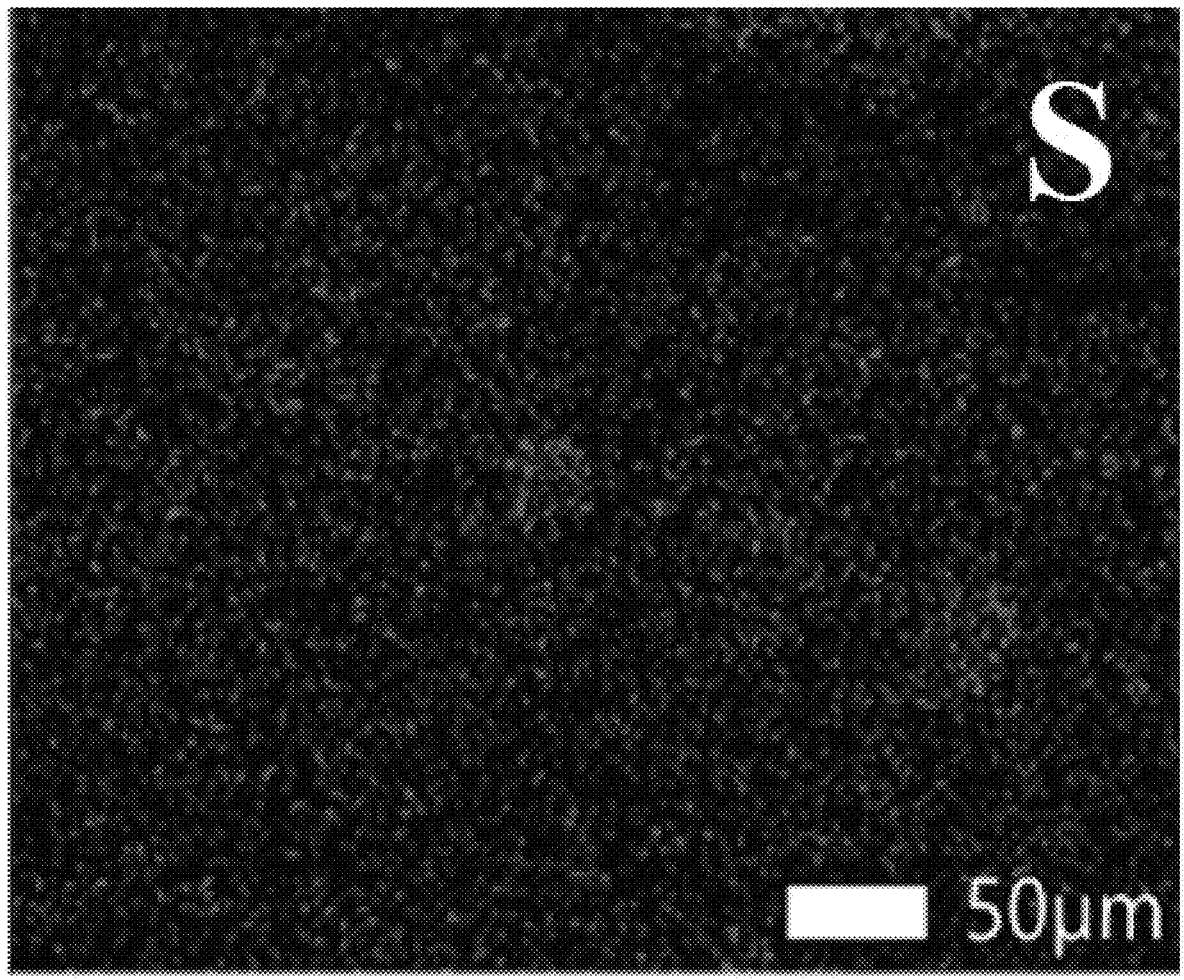

FIG. 3A shows an image of the $MoS_2$-PLA filament precursor composite, and FIG. 3B shows an image of the same material after being cut into the small pieces. FIG. 3C shows an image of the extruder. FIG. 4 shows an image of an object that was 3D-printed with the filament material extruded from the $MoS_2$-PLA filament precursor composite. FIGS. 5A and 5B show X-ray diffraction (XRD) results and infrared (IR) spectroscopy results, respectively, for the $MoS_2$-PLA filament precursor composite. FIGS. 6A and 6B show electron microscope images of the $MoS_2$-PLA filament precursor composite, plainly highlighting the layered structure. FIGS. 7A-7C show images for C, Mo, and S, respectively, in the $MoS_2$-PLA filament precursor composite.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method of fabricating an additive-polymer composite material, the method comprising:
   dispersing an additive material in a first solvent to obtain an additive homogeneous dispersion, the additive material being a two-dimensional (2D) material;
   dissolving a polymer in a second solvent to obtain a polymer base;
   mixing the additive homogeneous dispersion with the polymer base to obtain a mixed solution;
   performing solvent casting of the mixed solution to evaporate any solvent and obtain the additive-polymer composite material,
   the additive material being a transition metal dichalcogenide (TMD) with a formula of $MX_2$, where M is a transition metal atom and X is a chalcogen atom, and
   the mixing of the additive homogeneous dispersion with the polymer base comprising adding the additive homogeneous dispersion and the polymer base to an airtight container and rotating the airtight container in a centrifuge at a rate in a range of from 10 revolutions per minute (rpm) to 50 rpm for at least one hour.

2. The method according to claim 1, the additive material being a nanomaterial.

3. The method according to claim 1, the additive material comprising nanosheets.

4. The method according to claim 1, the TMD being $MoS_2$.

5. The method according to claim 1, further comprising cutting the additive-polymer composite material into a plurality of cut pieces each having a largest dimension of no more than 10 millimeters (mm).

6. The method according to claim 5, further comprising heating the plurality a of cut pieces in an oven at a temperature of at least 50° C.

7. The method according to claim 5, further comprising inserting the plurality of cut pieces into an extruder and extruding the plurality of pieces into a filament.

8. The method according to claim 7, further comprising, before inserting the plurality of cut pieces into the extruder, pre-heating the extruder to a temperature that is at least as high as a melting point of the polymer.

9. The method according to claim 1, the first solvent comprising at least one of a polar component and a hydrogen bonding component.

10. The method according to claim 1, the first solvent being different from the second solvent.

11. The method according to claim 1, the performing of the solvent casting comprising transferring the mixed solution to a receptacle and placing the receptacle in a ventilated fume hood.

12. The method according to claim 11, the performing of the solvent casting further comprising heating the mixed solution in an oven at a temperature of at least 50° C.

13. The method according to claim 1, the first solvent being N-methyl-pyrrolidone (NMP), isopropanol (IPA), or dimethyl sulfoxide (DMSO), and
   the second solvent being chloroform, methylene chloride, 1,1,2-trichloroethane, or dichloroacetic acid.

14. The method according to claim 1, the rotating of the airtight container in the centrifuge being performed for at least eight hours.

15. The method according to claim 1, the rate of rotating of the airtight container in the centrifuge being in a range of from 20 rpm to 35 rpm.

* * * * *